May 10, 1966 W. H. HORTON 3,250,193
AUTOMATIC FLASH EXPOSURE AT LOW LIGHT LEVEL ILLUMINATION
Original Filed Aug. 6, 1962
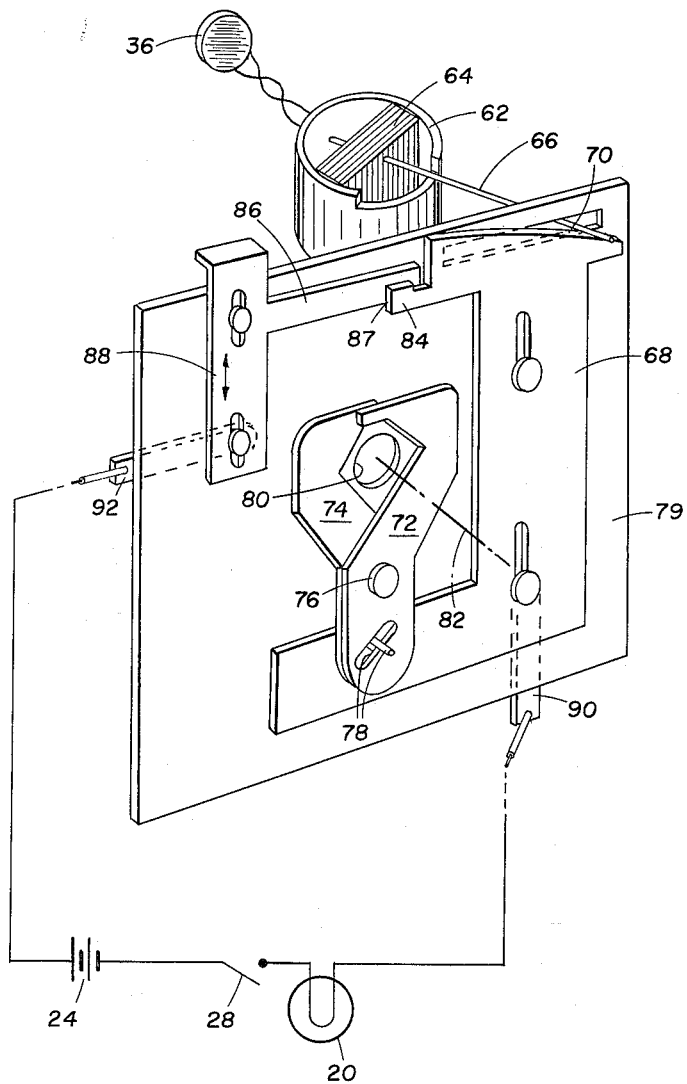
WILLIAM H. HORTON
INVENTOR.
BY R. Frank Smith
Robert W Hampton
ATTORNEYS

United States Patent Office 3,250,193
Patented May 10, 1966

3,250,193
AUTOMATIC FLASH EXPOSURE AT LOW LIGHT LEVEL ILLUMINATION
William H. Horton, Rochester, N.Y., assignor to Eastman Kodak Company, Rochester, N.Y., a corporation of New Jersey
Original application Aug. 6, 1962, Ser. No. 215,044. Divided and this application June 29, 1964, Ser. No. 378,849
Claims priority, application Great Britain, June 14, 1962, 22,844/62
7 Claims. (Cl. 95—10)

The present invention relates to photographic cameras and more particularly concerns automatic flash control systems for such cameras. This application is a divisional application of U.S. application Serial No. 215,044, filed August 6, 1962, now abandoned.

In cameras it has long been customary to employ photoflash lamps, timed with the camera shutters, to illuminate photographic subjects when scene brightness is low. The use of such photoflash lamps has given rise to several problems, the primary one being that the camera operator has had to make some determination of the necessity for flash operation.

With the advent of photoelectrically controlled exposure systems, it became a common practice to provide a camera with a viewfinder signal to indicate visually when the subject illumination is too low for normal photography and that flash operation is required for proper exposure. Nevertheless the problems of flash operation were still not ended. When the camera operator aims the camera he naturally wants to take a picture at that time. When he is apprised even by an automatic signal that flash operation is required, he must make any necessary adjustments of the camera for flash operation, e.g., coupling the diaphragm adjustment to the focus adjustment, manually setting the diaphragm and shutter, and of course inserting a flashlamp into the camera. By the time such adjustments have been made, and assuming that the photographer has the necessary flashlamp within convenient access, quite often the subject brightness has changed or the event to be recorded has transpired. It is then prudent for the photographer to remove the flashlamp from the camera unless he intends the next picture to be taken under flash conditions.

The above operation is entirely unsatisfactory and tends to discourage photography. It leads to waste of film when the photographer either forgets to insert a flashlamp or tries, without one, to photograph a relatively dark, transient event. It leads to waste of flashlamps, and possible overexposure of a subsequent picture when the photographer forgets to remove an unused flashlamp from the camera after an unsuccessful attempt to readjust the camera for flash operation before an event has transpired.

It is therefore a primary object of the present invention to control the operation of a flash bulb in a camera automatically, without any attention by or knowledge of the camera operator, such that flash operation will occur when scene brightness is at a low enough level to require it, but will not occur otherwise.

A further object of the invention is to permit a flashlamp to be carried in a camera socket at all times and automatically to prevent its ignition except during low levels of field brightness.

Another object of the invention is to provide a camera having a photoelectrically controlled exposure with means to also control the flash operation photoelectrically.

A still further object of the invention is to provide an integral flash lamp circuit in which the circuit is closed automatically to enable flash lamp energization, the automatic closure control being accomplished by the photoelectric diaphragm control elements of an automatic camera.

A more particular object of the invention resides in the use of the camera "pointer sensing" diaphragm control elements as a part of the flashlamp circuit to function as a switching means to operate the flashlamp circuit automatically.

Other objects and advantages will become apparent from the following description, the accompanying drawing forming a part thereof, and wherein the figure is a partial view of the elements of a camera embodying the present invention.

A typical exposure meter measuring instrument 62 has a pivoted coil 64, which is connected to and electrically energized by or under control of photocell 36. A pointer 66 is positioned by the coil 64 as a function of field brightness and moves to the left, as viewed in the drawing, in response to higher brightness levels.

A sensing member 68 is moved under manual control in a well known manner, for example as disclosed in U.S. Patent 2,999,441, and has a sloping or stepped surface 70 that is adapted to engage pointer 66. A pair of diaphragm vanes 72 and 74 are pivoted at 76 and are coupled to sensing member 68, for example, by pin-and-slot means as illustrated at 78. The diaphragm vanes cooperate to form an exposure aperture aligned with a fixed aperture 80 on the taking lens axis 82 of the camera defined by the plate 79. The greater the distance that the sensing member 68 moves upwardly prior to engagement of surface 70 with pointer 66, the larger the exposure aperture formed by diaphragm vanes 72 and 74 for taking a picture.

In accordance with the present invention, automatic flash control is accomplished by the foregoing apparatus by means of a switch 87, one contact of which comprises an ear 84 on sensing member 68, and the other contact of which comprises an arm 86 on a plate 88. Members 68, 84, 86 and 88 are formed of electrically conducting material. A pair of conducting members 90 and 92 are maintained in electrical contact with sensing member 68 and plate 88 and constitute input leads to the flashlamp circuit.

In series electrically with the member 68 and the plate 88 to form the flashlamp circuit is a flashlamp 20 and appropriate socket, a shutter synchronizing switch 28 operable in a known manner to close in timed relationship with a light shutter on the film exposure aperture, and an electrical potential source 24 constituted by batteries.

When the sensing member 68 is moved sufficiently upward so that the diaphragm blades 72 and 74 form the largest exposure aperture, i.e., in response to a low level of field brightness ordinarily requiring flash operation, switch contacts 84 and 86 close, thereby completing the lamp circuit. Plate 88 may be positionally adjustable in order to change the position at which its arm 86 is engaged by contact 84. The adjustment may be for factory calibration, or it may be accessible in order to adjust the plate 88 according to an exposure factor such as film speed. The remainder of the photoelectrically controlled camera is constructed in a manner known in the art and thus has not been shown in order to show the present invention more clearly.

In operation, a camera embodying the present invention with a flashlamp inserted is aimed at a suitable subject, and the diaphragm vanes 72, 74 assume an appropriate position in response to the positioning of sensing member 68. Simultaneously, switch 87 of the flashlamp circuit is closed or open, depending upon the scene light as determined by the exposure meter. Operation of the camera by the shutter control mechanism then causes synchronizing switch 28 to close and fire the flashlamp whenever scene light is to low and switch 87 is closed.

While the invention has been described with reference to a preferred embodiment, it is of course apparent that variations can be resorted to without departing from the scope of the invention or the scope of the subjoined claims.

I claim:

1. In a camera having a diaphragm mechanism and adapted to receive a flash lamp, the combination comprising: a series circuit including said lamp, a source of electrical potential, and switching means having a normally open and a closed condition; a photocell illuminatable by field light; manually operable means for adjusting said diaphragm mechanism from small to larger exposure apertures; an electric measuring instrument controlled by said photocell and having an output member positionable as a function of the illumination of said photocell; a sensing member movable in timed relation with the adjustment of said diaphragm mechanism and adapted to engage said output member for limiting the adjustment of said diaphragm mechanism as a function of the illumination of said photocell, said switching means comprising a first switch contact movable with said sensing member and a second switch contact engageable by said first contact only when said sensing member is moved to a position corresponding to a predetermined low level of photocell illumination.

2. In a camera adapted to receive a flash lamp, the combination comprising: an electrical series circuit including means to receive a flash lamp; means to hold a source of electrical potential with output terminals; and switch means having a closed position to complete the circuit and fire a flash lamp in the receiving means only when field light is below a selected predetermined level, and switch means including a first contact electrically connected with one terminal of the electrical potential, a photocell illuminatable by field light, an electric measuring instrument controlled by the photocell and having a movable output member positioned as a function of the illumination of the photocell, a movable sensing member engageable with the output member to be positioned by engagement therewith and connected electrically with the other terminal of the electrical potential, and a second contact integral with the sensing member to engage the first contact only when the output member is positioned in response to field light below the predetermined level.

3. The combination according to claim 2 wherein the first contact comprises a slidable plate and means to adjust the position of the plate to very the selected level of field light at which engagement is made with the second contact.

4. The combination according to claim 2 wherein the sensing member defines a verying surface engaging the output member and further comprising plate means defining a fixed aperture, and at least one movable diaphragm vane cooperating with the fixed aperture to form a composite exposure aperture, the vane being operably connected to the sensing member and positioned in response to engagement of the varying surface with the output member.

5. In a camera having means for exposing a photosensitive surface on a taking axis, the combination comprising:

a photocell having a moving output member positioned in response to field light;
a fixed plate defining a fixed aperture on the taking axis;
a movable and electrcailly conductive sensing plate member slidably attached to the fixed plate and having a surface engaging the output member to be positioned in response to the output member position;
at least one movable diaphragm vane having a variable surface cooperating with the fixed aperture to form a composite exposure aperture, the vane being operatively connected to the sensing member to be positioned in response to the positioning of the sensing member; and
a flash lamp circuit means operable to fire a flash lamp only when field light is below a predetermined level, the circuit means including:
  means for receiving a source of electrical potential and having two output terminals,
  means for electrically receiving a flash lamp in series electrically with the potential source,
  a first contact integral and movable with the sensing plate member and electrically connected through the sensing plate member to one output terminal, and
  a second plate contact attached to the fixed plate and electrically connected to the other output terminal, the first contact being positioned with the sensing plate member to engage to second contact and enable flash lamp firing only when the sensing plate member is positioned in response to field light below the predetermined level.

6. The combination according to claim 5 and further comprising means to slidably mount the second plate contact on the fixed plate to permit variable positioning of the second contact according to an exposure film factor.

7. The combination according to claim 5 and comprising a pair of diaphragm vanes having variable surfcaes cooperating to form an exposure aperture, the flash lamp circuit means being operable to fire a flash lamp only when the exposure aperture defined by the pair of vanes is greater in size than the fixed aperture.

References Cited by the Examiner

UNITED STATES PATENTS

| 3,031,939 | 5/1962 | Noak et al. | 95—10 |
| 3,048,091 | 8/1962 | Strehle | 95—10 |
| 3,073,226 | 1/1963 | Greger et al. | 95—10 |
| 3,106,141 | 10/1963 | Estes | 95—10 |
| 3,171,337 | 3/1965 | Fischer | 95—10 |

NORTON ANSHER, Primary Examiner.

J. F. PETERS, JR., Assistant Examiner.